United States Patent
Molgaard et al.

(10) Patent No.: US 7,051,127 B2
(45) Date of Patent: May 23, 2006

(54) METHOD AND APPARATUS FOR SELECTIVELY PROVIDING DATA PRE-EMPHASIS BASED UPON DATA CONTENT HISTORY

(75) Inventors: Jason M Molgaard, Loveland, CO (US); John Dykstal, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 411 days.

(21) Appl. No.: 10/144,278

(22) Filed: May 10, 2002

(65) Prior Publication Data
US 2003/0212843 A1 Nov. 13, 2003

(51) Int. Cl.
*G06F 13/00* (2006.01)

(52) U.S. Cl. .................. 710/100; 710/307; 710/29; 326/35

(58) Field of Classification Search ............... 710/100; 365/185, 189.11; 326/35; 327/112
See application file for complete search history.

(56) References Cited

U.S. PATENT DOCUMENTS

| | | | |
|---|---|---|---|
| 4,808,855 A | 2/1989 | Lloyd | |
| 5,497,113 A | 3/1996 | Uber | |
| 5,815,439 A * | 9/1998 | Korsh et al. | 365/185.24 |
| 6,256,235 B1 * | 7/2001 | Lee | 365/189.11 |
| 6,621,883 B1 * | 9/2003 | Ton | 375/377 |
| 2002/0118042 A1 * | 8/2002 | Helt et al. | 326/86 |
| 2002/0126531 A1 * | 9/2002 | Hosono et al. | 365/185.17 |
| 2002/0149395 A1 * | 10/2002 | Martin et al. | 326/115 |
| 2002/0186048 A1 * | 12/2002 | Tang et al. | 326/86 |
| 2003/0123389 A1 * | 7/2003 | Russell et al. | 370/230 |

FOREIGN PATENT DOCUMENTS

| | | |
|---|---|---|
| EP | 0963083 | 12/1999 |
| GB | 2377102 | 12/2002 |
| WO | 2000/18075 | 3/2000 |

* cited by examiner

*Primary Examiner*—Rehana Perveen
*Assistant Examiner*—Kim T. Huynh

(57) ABSTRACT

The present invention comprises a method and apparatus for selectively providing pre-emphasis to the output of a first driver during an initial portion of certain data transitions while transmitting data along a data bus from a source to a destination, with the certain data transitions being determined as a function of the content of the history of prior transmitted data cells. In the preferred embodiment, a pre-emphasis driver is connected in parallel to a normal driver and the pre-emphasis driver is activated preferably during the initial portion of a data transition to provide pre-emphasis in response to a control signal being applied to the pre-emphasis driver. The preferred embodiment of the present invention also comprises a sequence detector and control for monitoring the data cells or bits that are inputted to the normal driver to provide a history of the voltage levels of the data bits that are input to the normal driver. Based upon the history, the pre-emphasis driver is selectively operated to increase the slew or magnitude of the slope of a data transition at least during the initial portion of the transition.

19 Claims, 1 Drawing Sheet

METHOD AND APPARATUS FOR SELECTIVELY PROVIDING DATA PRE-EMPHASIS BASED UPON DATA CONTENT HISTORY

BACKGROUND OF THE INVENTION

The present invention generally relates to data transmission and more particularly to selectively providing pre-emphasis to data transmissions on a bus.

When data is transmitted from a source to a destination along a conductive path or bus, such as from a CPU or other integrated circuit chip to another circuit chip, data drivers are utilized to assert the data onto the bus. The requirements of a driver can vary significantly depending upon many factors including the speed in which the data is driven, the length of the bus between the source and the destination and the type of data transmission that is being carried out. If the source and destination are physically separated on a printed circuit board by a bus having a length that approaches three feet and the speed of operation is in the neighborhood of hundreds of megahertz (MHz), then a robust driver may be necessary to reliably communicate data from the source to the destination. However, more robust driver capability may require additional circuitry to implement and consume more power during operation. Given that a data bus may have up to 64 or more bit lines, such added circuitry required for driving each line may increase the cost of driver implementation as well as increase the power consumption of the integrated circuit. Moreover, circuit design may dictate that an implementation of driver architecture be uniform for a particular integrated circuit chip even though the chip may be used to transmit data onto busses having parameters that vary considerably depending upon the particular application. Circuit design simulation tools may be used to reliably determine whether transmission problems are likely in any particular application.

While it is possible to provide a uniform driver architecture that is intended for use in a multitude of applications, it is likely that some of the applications will require hard driving operation, which ultimately is likely to have damaging effects that in time will produce failure of the integrated circuit chip. Overdriving the receiver can also produce data reflections propagating back up the bus from the destination, as well as undesirable overshoot and undershoot conditions during data transitions between logic levels.

SUMMARY OF THE INVENTION

The preferred embodiment of the present invention comprises a method and apparatus for selectively providing pre-emphasis to the output of a first driver during an initial portion of certain data transitions while transmitting data along a data bus from a source to a destination, with the certain data transitions being determined as a function of the content of the history of prior transmitted data cells. The pre-emphasis results in a faster slew or greater magnitude slope of the voltage transition from low to high and from high to low levels. In the preferred embodiment, a pre-emphasis driver is connected in parallel to a normal driver and the pre-emphasis driver is activated preferably during the initial portion of a data transition to provide pre-emphasis in response to a control signal being applied to the pre-emphasis driver. The preferred embodiment of the present invention also comprises a sequence detector for monitoring the data cells or bits that are input to the normal driver to provide a history of the voltage levels of the data bits that have been input to the normal driver. Based upon the history, the pre-emphasis driver is selectively operated to increase the slew or magnitude of the slope of a data transition.

DETAILED DESCRIPTION

The present invention involves a method and apparatus for selectively providing pre-emphasis to data transitions of data cells that are being transmitted or driven on conductive lines such as a conductive bus comprising a plurality of wires in a ribbon connector or traces on a printed circuit board or the like.

Integrated circuit chips usually have to interface with other types of chips and require drivers to assert the data onto a bus that interconnects the chips. With regard to CPU and many other integrated circuit chips, they often have a portion of their circuitry that is referred to as a pad which contains a circuit driver and receiver and which interfaces core logic functions to a pin of the chip. It should be appreciated that a pad is required for each line of the bus, so that for a 64 line bus, there necessarily needs to be 64 data pads. Additional pads are required for parity bits, clock signals and strobe signals. In all, this amounts to a significant power requirement.

It should be understood that the specific circuitry that is utilized to implement a driver can vary considerably, but is well known to those of ordinary skill in the art. In integrated circuit chips that utilize a driver, it is common that the circuitry be implemented utilizing a plurality of field effect transistors connected in circuit. Because such designs are known to those of ordinary skill in the art, only a diagrammatic representation of actual drivers are shown in the attached drawings.

The present invention can be primarily utilized with circuitry where drivers assert data on a source synchronous bus, i.e., the driver circuitry generates its own clock and strobe and transmits them onto lines of the bus that are separate from the data lines. It is also useful in designs that do not have an open drain. In other words, the drivers are required to actually drive the data high and drive the data low. This is in contrast to types of pads having drivers that only drive low and generate a high level by using either an internal or external pull-up resistor in the pad or on a printed circuit board.

Figure 1:
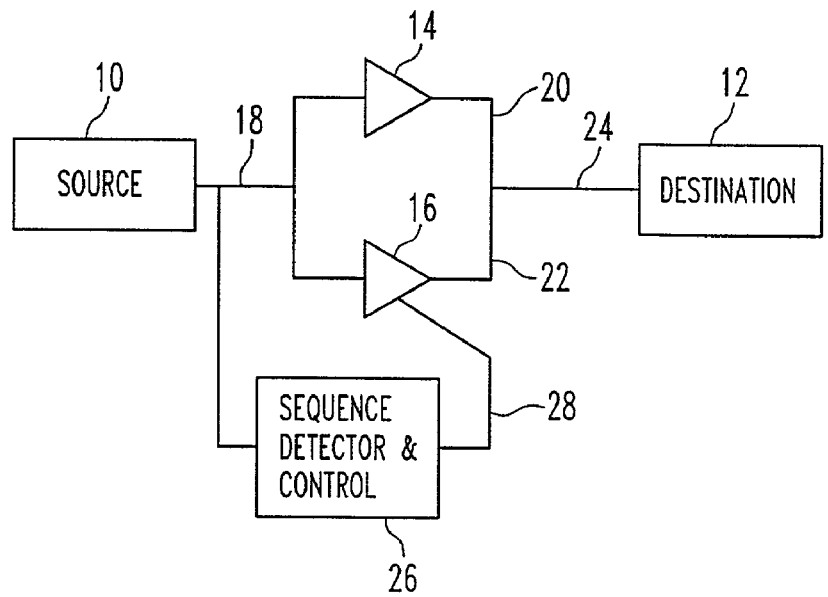
FIG. 1 is a simplified electrical schematic diagram of the preferred embodiment of the present invention and particularly illustrating a data sequence monitor in conjunction with a normal driver and a pre-emphasis driver.

Turning now to the drawings, and particularly FIG. 1, a simplified circuit diagram of the preferred embodiment of the present invention is illustrated and includes a source 10 which may be a CPU or the core logic of an integrated circuit which produces data to be transmitted to a destination 12, which is generally the pad of another integrated circuit. The data from source 10 is asserted on a bus 18 that extends to a normal driver 14 and a pre-emphasis driver 16 and the output of the driver 14 appears on line 20 which is connected to the output of driver 16 on line 22. Lines 20 and 22 are merged onto a bus 24 that extends to the destination 12. Thus, as shown in FIG. 1, the normal driver and pre-emphasis drivers 14 and 16 are connected in parallel with one another. A data sequence detector and control 26 is connected to the bus 18 upstream of the drivers 14 and 16 and has an output line 28 that activates the pre-emphasis driver 16. While the data sequence detector and control 26 is shown as one block, it performs more than one function, i.e., it detects the sequence of data cells and can therefore detect a number of consecutive same value data cells and activate the pre-emphasis driver 16 accordingly, and it may also control the duration of the pre-emphasis during a rising or falling transition. These functions could be shown as being separately performed, which would be within the scope of the present invention.

It should be understood that the initial period preferably starts at the actual beginning of the transition, but that it may be delayed a small amount without appreciable undesirable consequences. Pre-emphasis helps to overcome the capacitive and inductive loading of the bus, particularly one that is relatively long and where the speed of operation is several hundred MHz, for example. It has also been found that when several consecutive data cells having the same state are driven on the bus, capacitive and inductive loading is so great that the normal driver 14 if unaided by the pre-emphasis driver 16 will be unable to drive the bus to the opposite state sufficiently quickly to reach the threshold level that can be detected at the destination within the same clock phase. Generally, the threshold level is slightly more than one-half of the total available transition voltage. The output of the pre-emphasis driver 16 provides the extra drive to overcome the bus impedance. A desirable benefit that results from using the pre-emphasis driver only during an initial portion of the transition is that the slope or slew of the waveform decreases back to the slope provided by the normal driver 14 after the pre-emphasis driver 16 operation is ended. This tends to reduce the occurrence of data reflections at the destination, as well as overshoot and undershoot of the bus voltage as it transitions to either a high or low level.

When data cells of the data being transmitted change between low and high voltage or logic states frequently during transmission, the normal driver 14 may be expected to operate satisfactorily in most applications for which it is designed. However, when there are several consecutive data cells having the same logic state or voltage level, the accumulated capacitive and inductive energy can interfere with successful operation. The data sequence detector monitors the sequence of data cells to determine when a predetermined number of consecutive cells of the same state or voltage level are input to the drivers 14 and 16 and selectively triggers the pre-emphasis driver 16 on the next transition after there has been at least the required number of consecutive data cells of the same state.

In this regard, circuit simulators can be used to analyze a circuit having particular source 10 and destination 12 chips together with the type and length of the bus 24 and other operation parameters and can determine the severity of the loading that is likely to occur for a predetermined number of consecutive data cells having the same logic state. It is possible that the length of the bus, for example, is so long that the pre-emphasis driver 16 should be activated on every data transition, in which case the sequence detector and control 16 would be set to a value of 1 and thereby detect every cell. However, this is an extreme case. It has been found that the more likely circumstance is that such detrimental loading will occur after 2 or 4 consecutive data cells having the same logic state. This can be determined using a circuit simulator or by building systems and measuring actual operation. Once the value is determined, it can be loaded in sequence detector and control 26 which can activate the pre-emphasis driver 16 on the next transition after the requisite number (or more) of consecutive data cells having the same state have been detected. It should be understood that the functionality of the control 26 can be carried out by the source 10, if it is a chip that can provide such functionality, or it can be carried out by separate circuitry that may be added to a pad or as part of the driver circuitry. It is preferred that the detecting functionality be capable of being changed so that the number of requisite cells can be chosen from a value of 1 through 4 or more.

Figure 2:
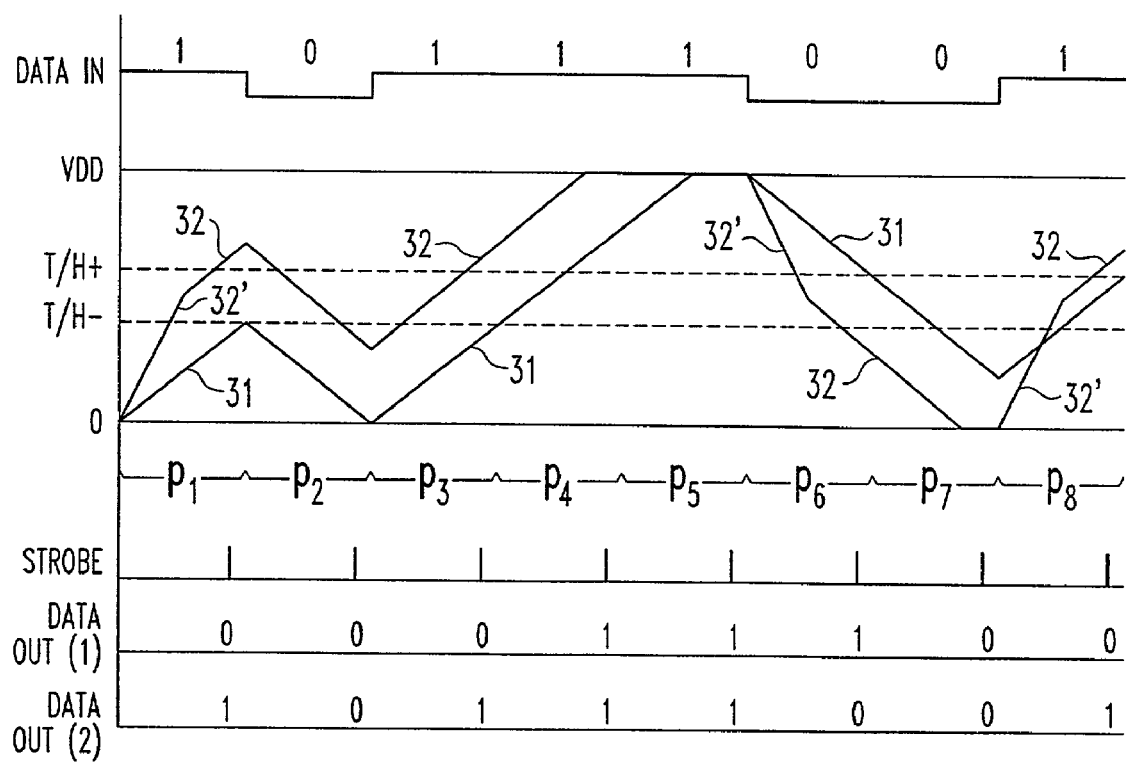
FIG. 2 is a graph of a waveform of three successive data cells (i.e., each data cell represents a complete clock cycle) illustrating data to be transmitted on a bus, the resultant voltage waveform on the bus and the data received from the bus.

The operation of the circuitry shown in FIG. 1 is illustrated with reference to the waveforms illustrated in FIG. 2. The upper trace of FIG. 2 is labeled $DATA_{IN}$, and represents a sequence of data bits to be transmitted over bus 24 during eight successive data cells or clock cycles, $p_1$ through $p_8$. The next lower traces represent the resulting voltage waveform on bus 24 under two operating conditions. The first is identified by reference numeral 31 and shows an illustrative waveform that may result when only normal driver 14 is used. The second is identified by reference numerals 32 and 32' and shows an illustrative waveform that may result when pre-emphasis driver 16 is operated in accordance with the present invention.

The voltage on bus 24 may vary between 0 volts and $V_{DD}$, representing the rail voltages between which integrated circuit devices connected to the bus operate. Also shown are the threshold voltage levels T/H+ and T/H−, indicating the bus voltage levels that may be reliably detected at destination 12 as representing a logic 1 or logic 0. Detection and latching of the detected bus value is triggered by a strobe signal that occurs near the end of each clock cycle. It will be recognized that the bus may be driven between positive and negative voltages or zero and negative voltages rather than zero and positive voltages as a matter of design choice. Also, higher voltage may represent a logic 0 and lower voltage may represent logic 1. In the present example, higher voltage represents logic 1 and lower voltage represents logic 0.

For purposes of illustration, it is assumed that the voltage on bus 24 is 0 volts at the beginning of clock cycle $p_1$. This is the condition that would exist, for example, if several successive data bits, e.g., three or more, represented by 0 volts had previously been transmitted over bus 24. Also, for purposes of illustration, the predetermined number of consecutive data cells loaded in sequence detector and control 26 is selected to be two. Thus, pre-emphasis will be applied during each clock cycle that carries a state (high or low) that immediately follows two or more consecutive clock cycles that carried the opposite (low or high) state.

If bus 24 is driven by normal driver 14 only to transmit the data sequence $DATA_{IN}$ (10111001), the voltage waveform 31 may, depending upon circuit parameters of a particular application, appear on bus 24. It will be apparent that this waveform is not satisfactory to permit the data sequence to be reliably detected at destination 12. For example, the rise time of waveform 31 during clock cycle $p_1$ is too slow to reach T/H+ before the end of the clock cycle, so that the value detected at destination 12 during clock cycle $p_1$ strobe will be low or logic 0. This condition is repeated during clock cycle $p_3$.

Clock cycle $p_6$ is illustrative of this same condition occurring in the negative-going direction. At the beginning of clock cycle $p_6$, the bus voltage is at its positive maximum, $V_{DD}$. This is the result of three successive logic 1 values, which over three clock cycles ($p_3$, $p_4$, $p_5$) has driven the bus voltage to $V_{DD}$. The slope of waveform 31 resulting from the use of normal driver 14 only, is insufficient to reach T/H– during clock cycle $p_6$. Accordingly, instead of detecting a low voltage representing logic 0 during clock cycle $p_6$ strobe, destination 12 will detect high voltage or logic 1.

The detected logic values at destination 12 resulting from the use of normal driver 14 only are shown as $DATA_{OUT}(1)$ below the bus voltage waveforms in FIG. 2. It will be seen that the $DATA_{IN}$ bit sequence of 10111001 has been improperly detected as 00011100. Although the use of error codes and parity checks can show that the data received at destination 12 contains errors, the high error rate renders the bus operation totally unsatisfactory. Satisfactory operation may be provided, however, by use of pre-emphasis as disclosed in patent application Ser. No. 10/144411, filed contemporaneously herewith and commonly assigned to Hewlett-Packard Company Satisfactory operation of the bus with the added benefit of reduced power consumption may be provided by the use of selective pre-emphasis.

Waveform 32, 32' of FIG. 2 illustrates a voltage waveform that, depending upon circuit parameters of a particular application, may appear on bus 24 with the use of selective pre-emphasis. For illustrative purposes, pre-emphasis provided by pre-emphasis driver 16 is shown as occurring for approximately 50% of each clock cycle. The waveform resulting from simultaneous operation of both normal driver 14 and pre-emphasis driver 16 is designated as 32', while the waveform resulting from the operation of normal driver 14 only after control 26 has terminated the operation of pre-emphasis driver 16 during each clock cycle is designated as 32.

Sequence detector and control 26 has determined that two or more consecutive lows have occurred immediately prior to the high of clock cycle $p_1$, and therefore applies pre-emphasis during clock cycle $p_1$.

It will be seen that during the first half of clock cycle $p_1$ the increased slope of waveform 32' has raised the bus voltage to near the positive threshold level of T/H+. After pre-emphasis is terminated, the voltage continues to increase according to waveform 32 under the influence of normal driver 14 only, so that by the time of clock cycle pi strobe, the bus voltage is solidly above T/H+ and will be reliably detected as a logic 1.

Clock cycle $p_6$ is illustrative of this same condition occurring in the negative-going direction. Prior to the low of clock cycle $p_6$, there have been two or more consecutive highs, so sequence detector and control 26 applies pre-emphasis during clock cycle $p_6$.

At the beginning of clock cycle $p_6$, the bus voltage is at its positive maximum, $V_{DD}$. This is the result of three successive logic 1 values, which over three clock cycles ($p_3$, $p_4$, $p_5$) has driven the bus voltage to $V_{DD}$. During the first half of clock cycle $p_6$ the use of pre-emphasis driver 16 in parallel with normal driver 14 lowers the bus voltage to near the negative-going threshold T/H–. After pre-emphasis is terminated, the voltage continues to decrease according to waveform 32 under the influence of normal driver 14 only, so that by the time of clock cycle $p_6$ strobe, the bus voltage is solidly below T/H– and will be reliably detected as a logic 0.

It should be noted that no pre-emphasis has been applied during clock cycles $p_3$–$p_5$ and $p_7$. This is because clock cycles $p_3$–$p_5$ and $p_7$ do not meet the criteria being followed by sequence detector and control 26. More particularly, clock cycles $p_3$, $p_4$ and $p_7$ do not immediately follow two or more consecutive clock cycles having the same state. Clock cycle $p_5$, although it follows two or more consecutive clock cycles having the same state, does not carry a bit of the opposite state. Therefore, no pre-emphasis is called for.

The detected logic values at destination 12 resulting from the use of pre-emphasis according to the present invention are shown as $DATA_{OUT}(2)$ below the bus voltage waveforms in FIG. 2. It will be seen that the $DATA_{IN}$ bit sequence of 10111001 has been properly detected as 10111001.

The use of pre-emphasis according to the present invention is not limited to particular bus configurations or clock frequencies, however, by way of example, it may be instructive to consider a bus operating at 532 MHz such that each clock cycle has a period of approximately 1.88 nanoseconds. If the leading edge of the strobe signal occurs at 1.70 nanoseconds +/–0.10 nanoseconds of each clock cycle, then reliable bus operation can be achieved if the bus voltage is solidly driven to a voltage above the positive-going threshold (or below the negative-going threshold) within approximately 1.5 nanoseconds, so that a voltage indicating the correct logic state will be present on the bus for the last 0.38 nanoseconds of each clock cycle; well within the time tolerance of the strobe signal.

The clock or strobe signal that is applied on a bus line separate from the data lines may also be provided with pre-emphasis depending upon the particular application that is employed. Since the clock or strobe signal is continuous, there will not be any consecutive data cells with the same value. In this regard, circuit modeling or field testing may be used to determine whether pre-emphasis should be provided in any particular application.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the following claims.

What is claimed is:

1. Apparatus for transmitting data from a source to a destination that is located a distance from the apparatus along a data bus, said apparatus comprising:
   a first driver for transmitting data along the data bus responsive to data being input thereto, said first driver producing data transitions between first and second driven logic states, said transitions having a first slope magnitude;
   a second driver connected in parallel with said first driver for selectively providing pre-emphasis to the data being transmitted by said first driver, whereby the slope of said transitions is increased at least during an initial portion of the transitions;
   a data detector located upstream of said second driver which monitors at least a predetermined number of consecutive data cells preceding a data cell to be transmitted by said first driver and selectively activates said second driver based upon the content of said predetermined number of consecutive data cells.

2. Apparatus as defined in claim 1 wherein said data transitions are either rising or falling, the magnitude of the slope of said rising and falling transitions of data transmitted by said first driver being substantially equal.

3. Apparatus as defined in claim 1 wherein said data detector selectively activates said second driver based upon a predetermined number of consecutive data cells having the same state.

4. Apparatus as defined in claim 3 where said predetermined number of data cells is four and said predetermined number of consecutive data cells having the same state is two.

5. Apparatus as defined in claim 3 where said predetermined number of data cells is four and said predetermined number of consecutive data cells having the same state is four.

6. Apparatus for selectively providing pre-emphasis to data being transmitted along a conductive data path from a source to a destination, said apparatus comprising:
    a first driver for driving input data comprised of cells having high or low voltage levels, said driver driving the data at either a high or a low voltage level onto the data path, with the transitions between high and low levels having first predetermined respective rising and falling time durations;
    a second driver for providing pre-emphasis to data transitions produced during operation of said first driver, to shorten the rising and falling time durations of transitions relative to said first predetermined rising and falling time durations for at least a predetermined initial portion of said transition; and,
    a detector for monitoring at least a first predetermined number of the data cells that are being input to said first driver for determining a second predetermined number of consecutive data cells having the same voltage level and activating said second driver for a third predetermined number of transitions when said second predetermined number is reached.

7. Apparatus as defined in claim 6 wherein said first predetermined number is four.

8. Apparatus as defined in claim 6 wherein said second predetermined number is four.

9. Apparatus as defined in claim 6 wherein said second predetermined number is two.

10. Apparatus as defined in claim 6 wherein said third predetermined number is one.

11. Apparatus as defined in claim 6 wherein said first predetermined rising and falling time durations are substantially the same.

12. Apparatus for selectively providing pre-emphasis to data being transmitted along a conductive data path from a source to a destination, said apparatus comprising:
    means for driving input data comprised of cells having high or low voltage levels, said driving means driving the data at either a high or a low voltage level onto the data path, with the transitions between high and low levels having first predetermined respective rising and falling time durations;
    means for providing pre-emphasis to data transitions produced during operation of said driving means, to shorten the rising and falling time durations of transitions relative to said first predetermined rising and falling time durations for at least a predetermined initial portion of said transition; and,
    means for monitoring at least a first predetermined number of the data cells that are being input to said driving means for determining a second predetermined number of consecutive data cells having the same voltage level and activating said pre-emphasis providing means for a third predetermined number of transitions when said second predetermined number is reached.

13. A method of transmitting data along a bus from a source to a distant destination, the method comprising:
    inputting data to a driver which transmits data cells having either high or low voltage levels wherein voltage transitions between cells have a generally first magnitude of slope;
    monitoring said data being input to said driver to determine the voltage level history of a plurality of consecutive data cells;
    selectively increasing the slope of at least the initial portion of particular data transitions as a function of the determined voltage level history.

14. A method of transmitting data comprising data cells with either high or low logic states along a bus from a source to a destination, the method comprising:
    inputting data to a first driver of the type which drives the inputted data cells onto the bus, including producing data transitions where the logic state changes between the high and low states, the rising and falling time durations of said transitions being a first predetermined value;
    inputting data to a second driver of the type which produces pre-emphasis to data transitions of data cells that have been driven onto the bus by the first driver;
    operating said first driver to drive said inputted data cells onto the bus;
    operating said second driver to produce pre-emphasis to data transitions when it is operating;
    said step of operating said second driver being performed in response to a predetermined number of consecutive data cells having the same logic state being previously input to said first driver.

15. A method as defined in claim 14 wherein said step of operating said second driver is performed for a single data transition once performed, and is prevented from operating again until another predetermined number of data cells having the same logic state are input to said first driver.

16. A method as defined in claim 15 wherein said predetermined number of data cells is determined based upon the amount of capacitance and inductance that is experienced in the bus which must be overcome to avoid degradation of the data integrity.

17. A method as defined in claim 16 wherein said predetermined number is within the range of 2 to about 4.

18. A method as defined in claim 14 wherein the first and second drivers are of the type which operate on a source synchronous bus, and which are not open drain drivers, but which drive transitions to the low value and drive transitions to the high value during operation.

19. A method of driving data having high and low logic states along a bus from a source to a destination, wherein the destination is sufficiently distant that degradation of the data integrity can occur, the method comprising:
    applying data to a first driver having an output connected to the bus, said first driver driving its output at a high or a low voltage level in accordance with the content of the applied data, and producing a data transition when said driver changes its output voltage level, the rising and falling time durations of said transitions being a first predetermined value;
    applying data to a second driver of the type which produces pre-emphasis to data transitions that have been driven onto the bus by the first driver;

operating said first driver to provide said high and low voltage levels onto the bus in accordance with the content of said applied data;

operating said second driver to provide pre-emphasis and thereby shorten the rising and falling time duration for an initial portion of a data transition in response to a control signal being applied to said second driver, the pre-emphasis being terminated near the end of the transition to reduce data reflections from the destination as well as reduce overshoot and undershoot of the voltage as it approaches the changed voltage level;

said step of operating said second driver being performed in response to a predetermined number of consecutive data cells having the same logic state being previously input to said first driver.

* * * * *

UNITED STATES PATENT AND TRADEMARK OFFICE
CERTIFICATE OF CORRECTION

| | | |
|---|---|---|
| PATENT NO. | : 7,051,127 B2 | Page 1 of 1 |
| APPLICATION NO. | : 10/144278 | |
| DATED | : May 23, 2006 | |
| INVENTOR(S) | : Jason M Molgaard et al. | |

It is certified that error appears in the above-identified patent and that said Letters Patent is hereby corrected as shown below:

In column 5, line 43, delete "pi" and insert -- $p_1$ --, therefor.

Signed and Sealed this

Seventeenth Day of March, 2009

JOHN DOLL
*Acting Director of the United States Patent and Trademark Office*